UNITED STATES PATENT OFFICE.

MAURICE MARC MÉRAN, OF PARIS, FRANCE.

CERAMIC PRODUCT.

No. 827,550.        Specification of Letters Patent.        Patented July 31, 1906.

Application filed October 28, 1905. Serial No. 284,874.

*To all whom it may concern:*

Be it known that I, MAURICE MARC MÉRAN, manufacturer, of 155 Rue du Faubourg Poissonnière, in the city of Paris, Republic of France, have invented a Ceramic Product, of which the following is a full, clear, and exact description.

It is known that while the silicates of alumina, with which ordinary ceramic products are manufactured, will not withstand the action of acids or of bases, the silicates of magnesia, on the contrary, are not attacked by acids or bases. It is therefore very important to incorporate these silicates of magnesia employed pure with ceramic products intended to serve as porous partitions or vessels in electrolytic baths, batteries, accumulators, &c. Now the silicates of magnesia—such as asbestos, steatite, talc, serpentine, &c.—when employed pure are not well adapted for the formation of a ceramic product. They are worked with difficulty, because they are wanting in plasticity, and after firing they do not present much strength unless they are raised to a temperature sufficient to vitrify them; but in this case they lose their natural formation and are no longer porous. If attempts are made to obviate this difficulty by mixing them with silicates of alumina, so as to impart to them the plasticity required and also the necessary strength after firing, while at the same time leaving them porous, products containing alumina are obtained which are attacked by acids and bases and give alumina salts.

The present invention has for its object a ceramic product constituted by magnesia silicates employed pure, but nevertheless presenting sufficient plasticity before firing and great strength when they have been fired. This ceramic product is obtained by the mixture of asbestos (double silicate of lime and magnesia) and of steatite, (trisilicate of magnesia,) which is very finely pulverized and intimately mixed to form a paste in the manner employed in ceramics. The paste thus obtained is readily worked either by casting or molding. This paste fired at a high temperature, but one which is lower than the vitrification temperature, gives a strong, solid, and porous biscuit, which is not attacked by acids and bases, since it contains only silicates of magnesia. This novel ceramic product is of a very fine paste, and although very porous it is impenetrable by the smallest corpuscles, crystals, and salts. It therefore gives the best results in its application to electrolyzers and batteries and also furnishes excellent filtering partitions for the filtration of bases and acids, beverages, waters, and all liquids. It may be employed in all electrolytic baths, assures the contact of the liquids, while at the same time separating the electrolytes, opposes the smallest resistance to the passage of the current, and owing to its contexture and its exceedingly fine and numerous pores it provides rapid filtration, while opposing the passage of corpuscles or microbes of the greatest tenuity.

The preferred proportions to be employed are seventy per cent. of asbestos and thirty per cent. of steatite. These figures may, however, vary according to circumstances without modifying the principle of the invention. The first burning or biscuit of this pottery may be provided with an appropriate coating or enamel.

I claim—

1. The ceramic process which consists in mixing a double silicate of lime and magnesia with a trisilicate of magnesia to form a plastic paste and firing the said paste.

2. The ceramic process which consists in forming a plastic paste of a mixture of asbestos and steatite, and firing at a temperature below the vitrifying-point.

The foregoing specification of my ceramic product signed by me this 16th day of October, 1905.

MAURICE MARC MÉRAN. [L. S.]

Witnesses:
     F. W. CAULDWELL,
     MAURICE H. PIGNET.